United States Patent [19]
Myers

[11] Patent Number: 4,824,240
[45] Date of Patent: Apr. 25, 1989

[54] INTERNAL LASER INTERFEROMETER

[75] Inventor: Christopher S. Myers, Carlsbad, Calif.

[73] Assignee: Hughes Aircraft Company, Los Angeles, Calif.

[21] Appl. No.: 852,055

[22] Filed: Apr. 15, 1986

[51] Int. Cl.⁴ .................................................. G01B 9/02
[52] U.S. Cl. ..................... 356/4.5; 356/352; 356/358
[58] Field of Search ............... 73/657; 356/5, 28, 355, 356/356, 357, 358, 352, 4.5

[56] References Cited

U.S. PATENT DOCUMENTS

| | | | |
|---|---|---|---|
| 3,644,042 | 2/1972 | Kolb, Jr. et al. | 356/5 |
| 4,452,533 | 6/1984 | Miles et al. | 356/352 |
| 4,627,728 | 12/1986 | Willson | 356/352 X |

OTHER PUBLICATIONS

"Fabry-Perot Interferometric Sensor", R. O. Miles, A. Dandridge, A. B. Iveten, and Thomas G. Giallorenzi, Third International Conference On Integrated Optics and Optical Fiber Communication, San Francisco, CA, Apr. 27-29, 1981.

Primary Examiner—Davis L. Willis
Assistant Examiner—Matthew W. Koren
Attorney, Agent, or Firm—Joseph E. Szabo; Anthony W. Karambelas

[57] ABSTRACT

An instrument of measuring motion of a vibratory system, such as an ultrasonic bonder, employs a laser (10) that receives within its lasing cavity light transmitted (24) to the object (26) to be monitored and retroreflected (24), so that oscillations within the laser cavity experience interference peaks corresponding to the phase relation between the outgoing and incoming laser beams (24). The interference peaks of the beam within the cavity are counted to provide an indication of motion of the reflecting object. Sensitivity is enhanced by choosing a front reflector (14) of the laser cavity to have a transmissivity at the frequency of interest that is selected to achieve maximum interference peak values. The laser cavity length is selected to cause the laser to have no more than two modes at the output frequency of interest, thereby avoiding beat frequencies that approach the frequency of vibration of the mechanical system of which motion is being observed.

25 Claims, 1 Drawing Sheet

INTERNAL LASER INTERFEROMETER

BACKGROUND OF THE INVENTION

1. Field of the Invention

The present invention relates to methods and apparatus for monitoring motion of objects and more particularly concerns an internal laser interferometer system having increased sensitivity to motion of an object to be monitored and decreased sensitivity to effects of beat frequencies within the laser.

2. Description of Related Art

Testing, calibration and monitoring of vibratory systems such as ultrasonic bonders, acceleration testers, speakers and the like requires high precision measurement of motion, including displacements and velocities. A system capable of making measurements with the high precision required is shown in U.S. Pat. No. 3,644,042, entitled "Laser System For Monitoring The Motion Of Object". This patent discloses what is basically an internal laser interferometer in which motion of an object is monitored by directing a laser beam from a laser oscillator toward the object to be monitored and receiving energy retroreflected by the object back into the laser cavity. Depending upon the phase relation between the projected and reflected energy, oscillation intensity within the laser cavity is increased or decreased by the reflected incoming energy. When the object is at a distance from the laser cavity, that is an even integral multiple of one-half wavelength of the projected beam so that the retroreflected energy is in phase with cavity oscillations, the oscillations in the cavity are enhanced to a maximum extent. When the distance is an odd integral multiple of one-half wavelength, and reflected energy is of opposite phase, there is maximum destructive interference. As the object moves toward or away from the laser cavity, intensity of the oscillations within the cavity varies through successive maxima and minima, at successive one-half wavelength positions of the object, so that a count of these maxima and minima provides an indication of the displacement of the object, and the number of maxima and minima per unit of time indicates velocity. The maxima and minima are detected by transmitting a portion of the oscillations within the cavity out through the back reflector of the cavity to a suitable circuit including a detector sensitive to energy at the frequency of the laser beam.

The patent describes a Helium Neon laser in which oscillations at both 0.6328 and 3.39 micrometers are produced. The longer wavelength is transmitted to and reflected from the object to be monitored and re-enters the cavity to modulate the shorter visible wavelength (0.6328 micrometers) by virtue of inherent "competition effect" between the energy waves produced by the laser at the two wavelengths. Intensity of the shorter wavelength is detected to provide the desired output.

Equipment based upon principles of the system disclosed in the U.S. Pat. No. 3,644,042, is manufactured and sold by the assignee of the present invention as the "Hughes Model 2100 Ultrasonic Monitor". This equipment has been employed widely for monitoring of ultrasonic wire bonders and has enjoyed significant success. The equipment, although highly precise in its measurement, has a relatively low sensitivity that requires it to be positioned close to the object being monitored. Commonly, this ultrasonic motion monitor must be placed within one inch of the object being monitored in order to provide a variation of amplitude of the oscillations within the laser strong enough to be detected. Even so, output signal levels have measured amplitude variations of millivolts, a signal low enough to occasionally be in the noise level of the instrument. Furthermore, the system tends to generate its own interference fringe patterns, particularly during its relatively long warm-up time due to mode scanning. The prior system as described in U.S. Pat. No. 3,644,042, and as embodied in the Hughes Model 2100 Ultrasonic Monitor employs a laser having three longitudinal modes of oscillation at the 0.6328 micrometer output, which give rise to a beat frequency of about 60 kilohertz. This beat frequency is within the common frequency range (of about 15 to 100 kilohertz) of many ultrasonic bonders and prevents use of the instrument with bonders during a required warm-up time (commonly about 20 minutes) of the system. These beat frequencies change both in frequency and intensity as the cavity length of the laser changes during warm-up of the structure and provide spurious interference fringes that significantly interfere with the fringes or intensity beat variations caused by light reflected from the object being monitored. Not only do these spurious fringes generated by beat frequencies cause problems during warm up, thus requiring the long warm-up time, but they cause significant problems when the system is used in an environment that may experience temperature changes.

Accordingly, it is an object of the present invention to provide a motion monitoring system that has increased sensitivity and in which problems due to beat frequencies are minimized.

SUMMARY OF THE INVENTION

In carrying out principles of the present invention in accordance with a preferred embodiment thereof, motion of an object vibrating at a frequency within a given range of frequencies is monitored by generating a laser beam at a selected frequency between a pair of reflectors of a laser cavity, transmitting the beam at said frequency to an object and receiving energy of the beam reflected by the object back into the cavity to cause the oscillations within the cavity to experience interference peaks corresponding to motion of the object that varies the distance between the object and the cavity. According to one feature of the invention, there is transmitted through one of the reflectors toward the object a selected amount of the energy of the oscillations within the cavity, which amount is chosen to provide substantially maximum peaks of oscillation intensity within the cavity in response to the energy reflected from the vibrating object. Thus, according to one feature of the invention, transmissivity of the front reflector, through which the energy is transmitted to and received from the object is increased to provide an optimum output to the instrument detector. Transmissivity of the reflector is empirically selected to maximize amplitude of the interference peaks provided at the instrument output.

According to another feature of the invention, the laser is constructed to provide a laser beam oscillating within the cavity with modes of oscillation having a lowest beat frequency that is greater than any frequency within the range of frequencies of the object motion. More specifically, the laser is constructed to provide two or less modes of oscillation at the frequency that is projected to the object and monitored by the system output detector.

DETAILED DESCRIPTION OF THE INVENTION

Figure 1:
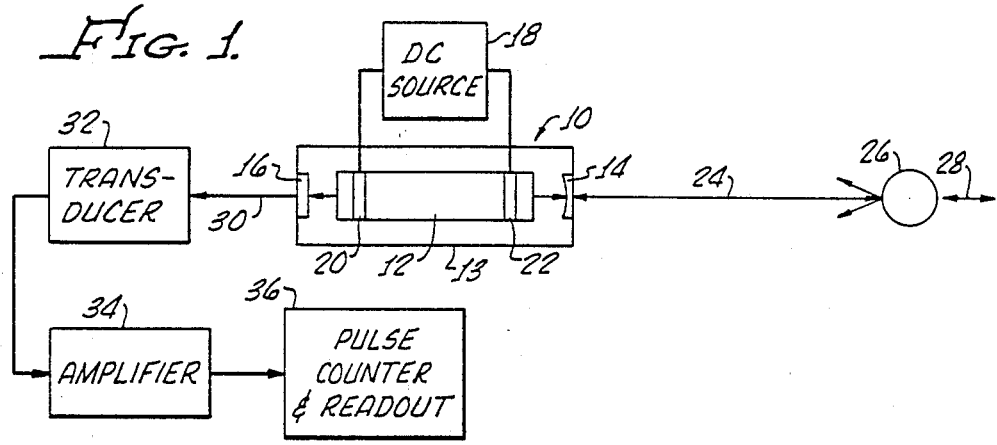
FIG. 1 is a simplified block diagram of a laser motion monitoring system embodying principles of the present invenion.

As shown in FIG. 1, a system embodying principles of the present invention includes a laser 10 comprising a laser bore 12 mounted by suitable means (not shown) in a laser body 13, between front and rear reflectors 14, 16. Contained within the laser bore is a laser medium, such as a helium/neon gas mixture for example, which is excited to a coherent lasing oscillation between the reflectors 14 and 16 by a DC power source 18 connected between laser lobe electrodes 20 and 22 that are coupled to the bore 12. Energy at the lasing wavelength is reflected back and forth between the reflectors 14 and 16 to provide the laser energy oscillations within a cavity that is defined between the reflectors. Energy of the lasing oscillations within the cavity is transmitted through the partially transmissive front reflector 14 along an optical path indicated at 24 to strike an object 26 that is to be moved with a component of motion in the direction indicated by arrow 28. Energy of the projected beam strikes the object 26, which is a poor reflector, reflecting only a small part of the incident energy back along the path 24 through the front reflector 14 and back into the laser cavity.

When the distance between the reflecting surface of object 26 and the reflecting surface of front reflector 14 is an even integral multiple of one-half of the wavelength of the oscillations within the laser cavity, the retroreflected energy is in phase with oscillations within the cavity, and the beam intensity within the cavity is maximized. A constructive interference peak, or energy peak, is produced. When the distance between the object and the reflector 14 is an odd integral multiple of a wavelength of the cavity oscillations, there is maximum destructive interference between the retroreflected energy and the energy within the cavity, whereby the latter experiences a minimum intensity or interference peak. As the object moves along the direction indicated at 28, the distance between the object and the reflector changes, as does the relative phase of reflected energy, and thus the amplitude of oscillations within the cavity experiences a peak to peak fluctuation directly related to the distance between the object and reflector 14. A count of the number of these peaks, which may also be termed interference fringes, thus provides a measure of the displacement of the object 26 toward or away from the laser, and a count of the number of such peak to peak fluctuations per unit of time provides a measure of velocity.

In order to monitor and count the peak to peak intensity variations of oscillations within the cavity, rear reflector 16 is also made partly transmissive, and thus a small amount of the energy within the cavity is also transmitted along an optical path 30, rearwardly of the laser, to a suitable transducer 32 such as a photo diode and fed through amplifying circuitry 34 to pulse counting and readout circuitry 36, which accordingly provides a display or permanent record of distance and/or velocity measured. The system described to this point is basically the same as that shown in U.S. Pat. No. 3,644,042.

One common use of a laser internal interferometer system is the precision measurement of amplitude of vibratory excursions (peak to peak physical displacement) of an ultrasonic bonder tip that vibrates at a known frequency. Knowing the frequency of vibration and the distance between object positions at which successive interference peaks are produced (such distance being one half wavelength of the oscillations within the laser cavity) a count of the number of such peaks that occurs in a given time interval gives a precise measure of the total bonder tip displacement amplitude. For an instrument employing 0.6328 micrometer energy, measurement accuracy is about 12.45 microinches.

According to one feature of the present invention, the low sensitivity of the prior system is increased by a surprisingly large amount by selecting an optimum transmissivity of the front reflector. Transmissivity of this reflector is selected to provide optimized output intensity peaks as will be more particularly described below.

One of a number of parameters (including gas pressure, bore diameter mixture ratio, cavity length, current density and gas temperature) that determine output power of a laser is the amount of reflectivity of the reflectors 16 and 14. For maximum power (other factors being constant) these reflectors should have 100 percent reflectivity, but of course, the forward reflector must be provided with some degree of transmissivity in order to provide a useful output beam. Frequently, the amount of transmissivity of the front reflector is selected for provision of maximum output power. It has been discovered, however, that, unexpectedly and surprisingly, optimum operation of the system illustrated in FIG. 1 may not occur at maximum power, and may not depend upon maximization of the power output. It has been found that by increasing transmissivity of the front reflector 14 of the system of U.S. Pat. No. 3,644,042, even at the expense of loss of power transmitted through the reflector, maximized output of the system is attained. For example, the above mentioned Hughes Ultrasonic Monitor employs a front reflector having a transmissivity of 1%. Changing the reflector transmissivity, according to a feature of the present invention, to 1.6% provides the instrument with greatly improved sensitivity, as will be discussed more particularly below. The desired criterion for determining optimization of output is the degree of the interferometer effect that occurs within the laser cavity, or, in other words, the amplitude of the interference peaks within the cavity. This interferometer effect is manifested as successive maxima and minima of intensity (i.e., interference peaks or fringes) of the output beam along the path 30 to the transducer 32, as the laser energy is transmitted to and retroreflected from the vibrating object.

The transmissivity of the reflector can be considered as a window in the front of the laser cavity through which output energy is transmitted and also through which retroreflected energy is received. Therefore, if this window (the amount of energy transmitted and, concomitantly, the amount of energy received) is enlarged, there will be a larger amount of retroreflected energy returned to the cavity and thus a larger interfering (constructively or destructively) signal will be fed back into the lasing cavity. The effect of increase in this interference effect, namely the increased peak amplitude of oscillation within the cavity, appears to outweigh any loss of output power caused by increased transmissivity of the front reflector 14. Thus the overall sensitivity of the system is increased by use of a front reflector of increased transmissivity.

Figure 2:
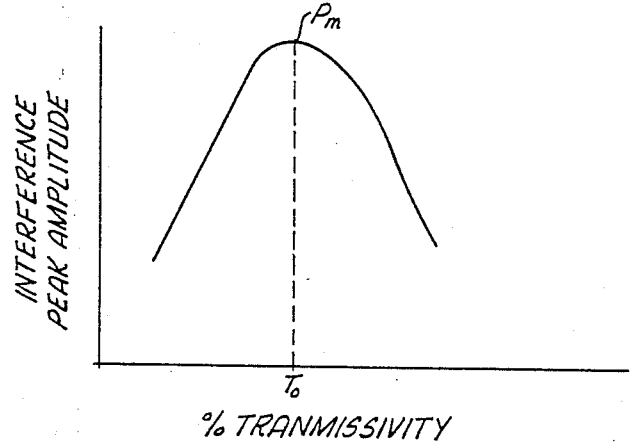
FIG. 2 is a graph illustrating variation of output peak amplitude of the laser in relation to transmissivity of the front reflector.

Illustrated in FIG. 2 is a graph that qualitatively illustrates increase in output interference peak amplitude as it varies with increase in front reflector transmissivity. As shown in this graph, value of the peak output amplitude (which is to be distinguished from the output power along optical path 24 at the front of the laser) reaches a maximum value $P_m$ with an optimum transmissivity $T_0$ of the front reflector 14.

In an exemplary system embodying principles of the present invention, the lasing medium is a mixture of helium and neon, and the laser cavity length is chosen (for reasons which will be discussed more particularly below in connection with a description of a second major feature of the present invention) to provide energy oscillations within the cavity of 0.6328 micrometers, while 3.39 micrometer energy oscillations are suppressed. Although the helium neon laser provides energy at both 0.6328 and 3.39 micrometers, energy at the longer wavelength is not of significance in operation of the present invention. The material of which the reflectors are made is chosen to have low reflectivity at 3.39 micrometers, thereby suppressing oscillations at this wavelength. Moreover, cavity length is selected to decrease the power at this wavelength, as described below. Thus, there is only one lasing frequency of interest, which is the frequency of oscillations within the cavity, the frequency of oscillations transmitted along optical path 24 and the frequency of output energy transmitted along path 30. This is the frequency at the 0.6328 micrometer wavelength.

Transmissivity of the front reflector 14 is chosen to provide the desired increased transmissivity for the selected wavelength. The selection is done empirically. The laser is set up at a distance from an object 26, which in the case of this empirical testing, may be a good reflector which will retroreflect a significant portion of light impinging on it back through the front reflector 14. A front reflector of a given transmissivity is mounted in the laser and peak amplitude of the output beam 30 is measured with the reflecting object 26 vibrating at a frequency such as 100 KHz for example. Thereafter the front reflector 14 is removed and a second reflector having a different transmissivity at the wavelength of interest is substituted. A succession of different front reflectors of transmissivities differing by small amounts, such as, for example, 0.1 percent, are mounted to the laser body and, with all other conditions and parameters remaining fixed, the peak amplitude of the output beam that is fed to transducer 32 is measured for each. These measurements provide a curve of the general shape illustrated in FIG. 2 and readily enable selecting of reflector transmissivity that provides the maximum or near maximum of interference peak amplitudes.

Prior systems, such as the Hughes Ultrasonic Monitor mentioned above, and the system of U.S. Pat. No. 3,644,042, embodying helium/neon laser mediums have employed front reflectors having a transmissivity of about 0.9 to 1 percent. Following the principles of the present invention, it is found that increased transmissivity will significantly enhance the output amplitude and thus greatly increase system sensitivity. For a helium/neon laser operating at 0.6328 micrometers, it is presently preferred to employ a front reflector 14 having a transmissivity that is greater than 1 percent and not more than about 2 percent. More specifically, the front reflector of presently preferred embodiment of the present invention has a transmissivity at 0.6328 micrometers of 1.6 percent.

It is found that with a laser constructed as set forth above sensitivity is significantly increased. In fact, even without an amplifier interposed between the front reflector 14 of the laser and the object, useful output signals are available at distances of up to 8 inches between the laser and a poorly reflecting object, such as a wire bonder tip. When used with objects having better reflectivity, greater useful distances are available. Moreover, whereas with prior systems the difference between output peak amplitude and steady state amplitude is measured in millivolts, a system constructed according to the present invention has an outpeak amplitude that differs from steady state value by about one volt, even where the laser to object distance has been increased from one inch to eight inches.

The amount of transmissivity of rear reflector 16 is not critical. Some useful amount of transmissivity must be provided because, in a preferred embodiment, the energy transmitted from the rear of the detector to the transducer provides the output signal. In a presently preferred embodiment, transmissivity of the rear reflector 16 is 1.2%. Because the transducer 32 receives the laser output beam from the rear of the cavity directly and not by way of reflection from an object having a reflection degrading surface, problems related to sensitivity at the front end of the laser are not experienced at the output. In fact, with a transmissivity of 1.2 percent of the rear reflector sensitivity of the output signal receiving circuitry may be decreased slightly because of the significant increase in output signal amplitude.

Figure 3:
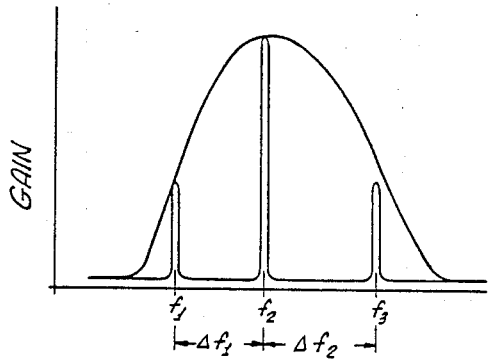
FIG. 3 is a graph of the Doppler broadened gain curve of a prior art laser employed for monitoring object motion.

In internal laser interferometer apparatus of the prior art, as exemplified in U.S. Pat. No. 3,644,042, the laser chosen provides a plurality of longitudinal modes of 0.6328 micrometer oscillation. FIG. 3 illustrates a Doppler broadened gain curve for the 0.6328 micrometer oscillation of the laser of U.S. Pat. No. 3,644,042. In this prior arrangement there are three distinct modes of the 0.6328 micrometer oscillation, indicated in FIG. 3 as $f_1$, $f_2$, and $f_3$, where $f_2$ is a center mode, and $f_1$ and $f_3$ are lower power auxiliary modes. Although, according to theory, the auxiliary modes $f_1$ and $f_3$ are equally spaced from the central mode $f_2$ so that $f_2-f_1$ should be equal to $f_3-f_2$, in an actual device the auxiliary modes have frequencies that slightly differ from the theoretical. These amounts of difference from the theoretical are very small at laser frequencies, but are significant at the vibratory frequency of an actual mechanical system. Thus with the three mode system of FIG. 3, there will be a relatively low beat frequency equal to the difference $(f_2+f_3)-(f_1+f_2)$. Because of the above mentioned a symmetry of $f_1$ and $f_3$ relative to $f_2$, this beat frequency in the laser of the U.S. Pat. No. 3,644,042 has a frequency of about 60 kilohertz. A practical, mechanical vibratory system, such as a supersonic bonder, for example, may have a frequency in the range of a few kilohertz up to about 100 kilohertz. Thus, the 60 kilohertz beat frequency of the three mode operation of the sensing laser of an internal laser interferometer system gives rise to spurious fringes (amplitude peaks), which may be readily confused with or in some cases actually not distinguishable from the intensity peaks caused by the interferometer action of the monitored body which itself is oscillating at a frequency relatively close to 60 kilohertz.

Further, as previously described, the 60 kilohertz beat frequency of the several modes will scan or vary as the temperature of the laser changes, particularly during warm-up. As the laser heats up the mirror separation increases. The position of the gain curve (FIG. 3) remains constant, and the mode separation remains almost constant but the comb (the entire group) of cavity modes drifts to lower frequencies. As each mode passes through the gain curve the laser power of such mode increases, passes through a maximum at the centre of the gain curve, decreases and finally disappears. Meanwhile another mode will begin to lase at the high frequency side of the curve. If the laser cools down the comb of modes drifts to higher frequencies. Thus the amplitude of each mode is related to its frequency, and the laser experiences temperature induced variation of oscillation intensity within its cavity which may mask the intensity variations that are due to the retroreflected energy.

Figure 4:
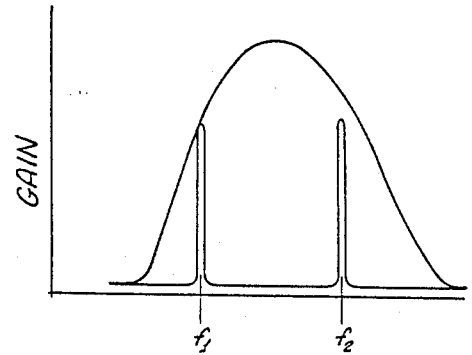
FIG. 4 is a Dopler broadened gain curve of a laser employed in practice of the present invention.

According to another feature of the invention, laser cavity length is chosen (shortened) to permit oscillatin of the 0.6328 micrometer energy with no more than two modes. By eliminating the three mode operation, the troublesome low beat frequency is avoided. Thus, as illustrated in FIG. 4, the Doppler broadened gain curve of the laser with the shortened cavity has two modes indicated at $f_1$ and $f_2$, which provide a beat frequency of 685 megahertz. This is many times greater than any frequency that is likely to exist in an actual mechanical system and is readily filtered by suitable filtering circuitry in or adjacent the amplifier 34 so as to remove any effects of this very high (relative the vibration frequency of the monitored object) beat frequency upon the output. Moreover, even though this beat frequency will also scan or vary as the laser warms up, it scans over a range of frequencies which are also far above any object vibration frequency of interest. Accordingly, the laser constructed to provide only two oscillation modes, as indicated in FIG. 4, is found to be useful in an internal interference system, and has a warm-up time of about 1 minute, a considerable improvement over the approximately 20 minute warm-up time required of the prior art system.

All other parameters being the same, a laser that is substantially identical to the laser shown in U.S. Pat. No. 3,644,042 and to that employed in the Hughes Model 2100 Ultrasonic Monitor is modified according to a feature of the present invention by changing the cavity length to cause it to support only two modes. According to a feature of the present invention, the spacing between the front and back reflectors 14 and 16 is decreased (from the approximately 11 inches) to about 8.50 inches or about 21.6 centimeters. Again, any loss of power caused by decrease in cavity length is outweighed by the greatly enhanced isolation of the instrument from effects of unwanted beat frequencies. Accordingly, a specific example of a laser embodying features of the present invention has a mirror to mirror spacing of 8.50 inches, a front reflector transmissivity of 1.6 percent to provide an output power of about 1 milliwatt, and a rear reflector having a transmissivity of about 1.2 percent to provide output power through the rear reflector of about 0.80 milliwatts. The front reflector is provided with a radius of curvature of about 30 centimeters which is somewhat greater than the cavity length, whereas the rear reflector is flat, having a substantially infinite radius of curvature.

It will be readily appreciated that a laser oscillating in but a single mode is also unaffectd by beat frequency problems, but the described helium/neon laser and use of its 0.6328 micrometer oscillations are preferred for a number of reasons, including the size, expense and common availability of the helium/neon laser. As mentioned above, decrease in cavity length is one of the factors that may tend to decrease output power of the laser, and therefore further decrease of cavity length beyond the length where the beat frequency causes no problem gives no advantage but actually is disadvantageous. However, any decrease in power in changing from the much greater cavity length of the U.S. Pat. No. 3,644,042 to the shorter cavity length described herein, is more than compensated for by the isolation of the laser output from effects of beat frequencies. Moreover, higher power lasers generally provide lasing oscillations in three or more modes, and thus give rise to even further problems. Accordingly, the laser monitoring system having the increased sensitivity achieved by selection of optimum transmissivity of the front reflector and having cavity length decreased to support only two modes, provides a highly desired balance between output power and precision stable oscillation.

In summary, it will be seen that changes in the internal interferometer laser system described herein include increase of front reflector transmissivity to a value that provides substantially maximum peak amplitude of interference fringes caused by retroreflection from a vibrating object. This increased transmissivity increases both the amount of energy transmitted to the object being monitored and the amount of reflected energy that reenters the laser cavity. In addition cavity length is decreased to enable support of no more than two modes. These improvements yield a surprisingly great increase in sensitivity and decrease in susceptibility to effects of beat frequencies. Monitoring distance has been increased from about one inch to about eight inches, output signals are manifested in volts rather than millivolts, and warmup time has been decreased from about twenty minutes to one minute.

The foregoing detailed description is to be clearly understood as given by way of illustration and example only, the spirit and scope of this invention being limited solely by the appended claims.

What is claimed is:

1. A laser motion measuring system comprising,
a laser body,
a laser medium in said body,
means for exciting the laser medium to generate coherent energy oscillation of a first frequency,
front and back reflectors mounted in said body to define a laser cavity and reflecting energy generated by the laser medium to provide energy oscillations within the cavity at said first frequency, said front reflector transmitting an energy beam of said first frequency from said cavity to an object of which motion is to be measured and transmitting energy reflected from said object back into the cavity to vary the amplitude of the energy oscillations within the cavity of said first frequency and provide interference peaks corresponding to the relative phase of the energy reflected from the object, said interference peaks having an amplitude that varies in accordance with variation of transmissivity of said front reflector, and output means for receiving energy of said first frequency from said cavity and for detecting the interference peaks of energy oscillations within the cavity at said first frequency, to thereby provide a measure of motion of said object, said front reflector having a transmissivity that causes the energy oscillations within the cavity to have substantially maximum interference peak values when the energy oscillations within the cavity of said first frequency are varied by reflections from an object of which motion is to be monitored.

2. The laser system of claim 1 wherein said cavity has a length that supports a maximum of two modes of energy oscillation at said first frequency.

3. The laser system of claim 1 wherein the laser medium is a mixture of helium and neon, and wherein the transmissivity of said front reflector at said first frequency is greater than 1 percent and less than about 2 percent at the said first frequency.

4. The laser system of claim 1 wherein said laser medium is a mixture of helium and neon and wherein the length of said cavity is not more than about 21.5 centimeters, whereby said laser will support only two modes of oscillation at a wavelength of 0.6328 micrometers.

5. The laser system of claim 1 wherein the laser medium is a mixture of helium and neon, wherein said first frequency comprises an oscillation having a wave length of 0.6328 micrometers, wherein said front and back reflectors are spaced by a distance of less than about 22 centimeters, to cause said laser cavity to support oscillation in no more than two modes, and wherein said front reflector has a transmissivity at said one frequency greater than 1 percent and less than about 2 percent.

6. The laser system of claim 1 wherein said object is to be monitored while it is moving at an object frequency and wherein said front and back reflectors are mutually spaced to provide multimode energy oscillations that produce no beat frequency less than a frequency that is many times greater than the object frequency.

7. The system of claim 1 wherein said means for exciting the laser medium causes generation of coherent energy oscillations at a second frequency that is lower than said first frequency, and including means for suppressing energy oscillations at said second frequency.

8. The laser system of claim 1 wherein said front and back reflectors are spaced to provide multimode energy oscillations that produce no beat frequency less than a frequency that is many times greater than about 100 KHz.

9. A laser motion measuring system for measuring motion of an object vibrating at an object frequency, said system comprising,
a laser body,
a laser medium in said body,
means for exciting the laser medium to generate coherent energy of a first frequency,
front and back reflectors mounted in said body to define a laser cavity and reflecting energy generated by the laser medium to provide energy oscillations within the cavity at said first frequency, said front reflector transmitting an energy beam of said first frequency from said cavity to an object of which motion is to be measured and transmitting energy reflected from said object back into the cavity to vary the amplitude of the energy oscillations within the cavity of said first frequency and provide interference peaks corresponding to the relative phase of the energy reflected from the object, output means for detecting the interference peaks of energy oscillations within the cavity at said first frequency, to thereby provide a measure of motion of said object, and said front and back reflectors being mutually spaced to provide multimode energy oscillations that produce no beat frequency less than a frequency that is many times greater than said object frequency.

10. The laser system of claim 9 wherein said cavity has a length that supports not more than two modes of energy oscillation at said first frequency.

11. The laser system of claim 9 wherein said front reflector has a transmissivity substantially equal to the value of that transmissivity at which said interference peaks have maximum amplitude.

12. The laser system of claim 9 wherein the laser medium is a mixture of helium and neon, and wherein the transmissivity of said front reflector at said first frequency is greater than 1 percent and less than about 2 percent at said first frequency.

13. The laser system of claim 9 wherein the laser medium is a mixture of helium and neon, wherein said first frequency comprises an oscillation having a wave length of 0.6328 micrometers, wherein said front and back reflectors are spaced by a distance of less than about 22 centimeters, to cause said laser cavity to support oscillation in no more than two modes, and wherein said front reflector has a transmissivity at said first frequency greater than 1 percent and less than about 2 percent.

14. The laser system of claim 9 wherein said laser medium is a mixture of helium and neon and wherein the length of said cavity is not more than about 21.5 centimeters, whereby said laser will support only two modes of oscillation at a wavelength of 0.6328 micrometers.

15. The method of optimizing the output of an internal laser interferometer measuring system of a type wherein a laser medium is excited in a cavity between front and back reflectors to create energy oscillations within the cavity at a first frequency that are transmitted through the front reflector to a vibrating object of which motion is to be monitored and reflected from the object back through the front reflector to modulate the energy oscillations at said first frequency within the cavity so as to provide reinforcement of said oscillations when energy reflected back into the cavity from the object is in phase with the oscillations within the cavity, and whereby intensity of the oscillations within the cavity varies as the distance to said object changes to thereby vary the phase of reflected energy, and whereby a count of amplitude peaks of the oscillations as the object moves provides an output that is a measure of the motion of the object, said method comprising causing said front reflector to have a transmissivity of said first frequency that provides optimum peak amplitudes of energy oscillation of said first frequency within said cavity for a reflecting object vibrating at a given distance from the laser.

16. The method of monitoring motion of an object vibrating at a frequency within a given range of frequencies comprising the steps of exciting a laser medium within a cavity defined between a pair of reflectors to generate a laser beam that oscillates within the cavity at a first frequency and with modes of oscillation having a minimum beat frequency greater than any frequency within said range of frequencies, projecting the laser beam from said cavity at said first frequency to an object spaced from said cavity and receiving energy of the beam reflected by the object back into the cavity to cause the first frequency oscillations within the cavity to experience interference peaks corresponding to motion of the object that varies the distance between the object and the cavity, and employing the interference peaks to generate a signal indicative of motion of the object by transmitting energy of said first frequency from said cavity to a detector.

17. The method of claim 16 wherein said step of projecting comprises transmitting through one of said reflectors a selected amount of the energy of the laser beam within the cavity that provides substantially maximum interference peaks within the cavity in response to energy reflected from said object.

18. The method of claim 17 wherein said selected amount is considerably greater than one percent of the energy of oscillations within the cavity of said first frequency.

19. The method of claim 16 including the step of suppressing oscillations within the cavity at frequencies considerably different than said one frequency.

20. The method of monitoring motion of an object vibrating at a frequency within a given range of frequencies comprising the steps of exciting a laser medium within a cavity defined between a pair of reflectors to generate a laser beam that oscillates within the cavity at a given frequency, projecting the laser beam from said cavity at said given frequency to an object spaced from said cavity and receiving energy of the beam reflected by the object back into the cavity to cause the oscillations within the cavity to experience interference peaks corresponding to motion of the object that varies the distance between the object and the cavity, said step of projecting comprising transmitting through one of said reflectors a selected amount of energy of the laser beam within the cavity that provides substantially maximum interference peaks within the cavity in response to energy reflected from said object at the given frequency, and employing the intensity peaks to generate a signal indicative of motion of the object.

21. The method of claim 20 wherein said laser medium is a mixture of helium and neon, and wherein said step of projecting comprises projecting energy oscillations at a wavelength of about 0.6328 micrometers in an amount greater than 1 percent and not more than about 2 percent.

22. A laser motion measuring system comprising, a laser body, a laser medium in said body that can be excited to generate coherent energy of a first frequency, front and back reflectors mounted in said body to define a laser cavity and reflecting energy generated by the laser medium to provide energy oscillations within said cavity of said first frequency, said reflectors being mutually spaced to provide a cavity length that supports not more than two modes of oscillation at said first frequency, said laser system providing an output energy beam of said first frequency through said front reflector for transmission to an object of which motion is to be detected and for reflection from the object back through said front reflector to cause the energy oscillations of said first frequency within the cavity to experience interference peaks, output means responsive to energy of said first frequency for monitoring said interference peaks, the amplitude of said interference peaks having a maximum for a determined value of transmissivity of said front reflector, and said front reflector having a transmissivity substantially equal to said determined value.

23. The system of claim 22 wherein said laser medium is a mixture of helium and neon, and said cavity length is not greater than about 8.5 inches.

24. The system of claim 22 wherein said laser medium is a mixture of helium and neon, and wherein said front reflector has a reflectivity greater than one percent and not more than about two percent.

25. The method monitoring motion of an object by an internal laser interferometer comprising the steps of mounting front and back reflectors in a laser body to define a laser cavity, mounting a laser bore having a laser medium therein between the reflectors, exciting the laser medium to create energy oscillations within the cavity a first frequency, transmitting the energy through the front reflector to a vibrating object and receiving within the cavity energy retroreflected from the object back through the front reflector so as to provide interference peaks of said oscillations that correspond to distances of said vibrating object from the cavity, said interference peaks having an amplitude that varies in accordance with variation of transmissivity of said front reflector, and detecting interference peaks to provide a measure of motion of said object, said step of mounting front and back reflectors comprising mounting in said body a front reflector having a transmissivity that provided a substantially maximum amplitude of detected interference peaks.

* * * * *